(12) United States Patent
Downey et al.

(10) Patent No.: US 7,578,521 B2
(45) Date of Patent: Aug. 25, 2009

(54) ADD-ON INFLATABLE CURTAIN DEPLOYMENT RAMP TO CENTER PILLAR TRIM

(75) Inventors: Brian Downey, Farmington Hills, MI (US); Kristi Elliott-Rumberger, Farmington Hills, MI (US); Jamison Jaramillo, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 43 days.

(21) Appl. No.: 11/858,555

(22) Filed: Sep. 20, 2007

(65) Prior Publication Data
US 2008/0007034 A1 Jan. 10, 2008

Related U.S. Application Data

(63) Continuation-in-part of application No. 11/384,880, filed on Mar. 20, 2006.

(51) Int. Cl.
*B60R 21/213* (2006.01)
(52) U.S. Cl. .................................. 280/730.2
(58) Field of Classification Search .............. 280/730.2, 280/728.3, 728.2
See application file for complete search history.

(56) References Cited

U.S. PATENT DOCUMENTS

| 5,265,903 A | 11/1993 | Kuretake et al. |
| 5,273,309 A | 12/1993 | Lau et al. |
| 5,322,322 A | 6/1994 | Bark et al. |
| 5,462,308 A | 10/1995 | Seki et al. |
| 5,480,181 A | 1/1996 | Bark et al. |
| 5,540,459 A | 7/1996 | Daniel |
| 5,588,672 A | 12/1996 | Karlow et al. |
| 5,605,346 A | 2/1997 | Cheung et al. |
| 5,660,414 A | 8/1997 | Karlow et al. |
| 5,681,055 A | 10/1997 | Green et al. |
| 5,755,457 A | 5/1998 | Specht |

(Continued)

FOREIGN PATENT DOCUMENTS

DE 4134995 3/1993

(Continued)

OTHER PUBLICATIONS

Passive Safety Interior (web page) http://www.daihatsu.com/technology/safety/inter/inter.html.

(Continued)

*Primary Examiner*—D. Glenn Dayoan
*Assistant Examiner*—Joselynn Y. Sliteris
(74) *Attorney, Agent, or Firm*—Young Basile

(57) ABSTRACT

A pillar trim component can include a main body member and a separately formed airbag support member having an integrally formed inflatable curtain deployment trajectory ramp surface, and complementary interconnecting shaped portions formed on the main body member and the airbag support member for interlocking assembly of a subassembly of the airbag support member to the main body member prior to installation in a motor vehicle. The complementary interconnecting shaped portions, when assembled, prevent unintended disassembly of the subassembly. An airbag positioning portion can be defined by at least a portion of an upwardly extending wall of the airbag support member angled inboard toward the main body member. A headliner retaining portion can be defined by a recess formed between the deployment surface and the main body member.

22 Claims, 7 Drawing Sheets

U.S. PATENT DOCUMENTS

| | | | |
|---|---|---|---|
| 5,788,270 A | 8/1998 | Haland et al. |
| 5,791,683 A | 8/1998 | Shibata et al. |
| 5,884,937 A | 3/1999 | Yamada |
| 6,056,316 A | 5/2000 | Yamaji et al. |
| 6,079,732 A | 6/2000 | Nakajima et al. |
| 6,082,761 A | 7/2000 | Kato et al. |
| 6,099,029 A | 8/2000 | Haland et al. |
| 6,103,984 A | 8/2000 | Bowers et al. |
| 6,129,377 A | 10/2000 | Okumura et al. |
| 6,142,506 A | 11/2000 | Patel et al. |
| 6,158,767 A | 12/2000 | Sinnhuber |
| 6,168,191 B1 | 1/2001 | Webber et al. |
| 6,179,324 B1 | 1/2001 | White, Jr. et al. |
| 6,220,623 B1 | 4/2001 | Yokota |
| 6,224,092 B1 | 5/2001 | Sakamoto et al. |
| 6,254,123 B1 | 7/2001 | Urushi et al. |
| 6,279,941 B1 | 8/2001 | Nakajima et al. |
| 6,302,434 B2 | 10/2001 | Nakajima et al. |
| 6,305,707 B1 | 10/2001 | Ishiyama et al. |
| 6,328,333 B1 | 12/2001 | Patel et al. |
| 6,332,628 B1 | 12/2001 | Tschaeschke |
| 6,333,515 B1 | 12/2001 | Kubota et al. |
| 6,364,346 B1 | 4/2002 | Preisler et al. |
| 6,367,872 B1 | 4/2002 | Bohm et al. |
| 6,371,512 B1 | 4/2002 | Asano et al. |
| 6,402,192 B2 | 6/2002 | Haland et al. |
| 6,450,529 B1 | 9/2002 | Kalandek et al. |
| 6,485,048 B2 | 11/2002 | Tajima et al. |
| 6,485,049 B1 | 11/2002 | Prottengeier et al. |
| 6,494,480 B2 | 12/2002 | Haland et al. |
| 6,513,864 B2 | 2/2003 | Bohm et al. |
| 6,520,533 B2 | 2/2003 | Tanase et al. |
| 6,530,594 B1 | 3/2003 | Nakajima et al. |
| 6,543,841 B1 | 4/2003 | Ohkubo |
| 6,550,851 B2 | 4/2003 | Seifert |
| 6,565,117 B2 | 5/2003 | Kubota et al. |
| 6,592,143 B2 | 7/2003 | Takahashi et al. |
| 6,619,690 B2 | 9/2003 | Tanase et al. |
| 6,623,031 B2 | 9/2003 | Haland et al. |
| 6,644,687 B2 | 11/2003 | Saito et al. |
| 6,664,470 B2 | 12/2003 | Nagamoto |
| 6,672,027 B2 | 1/2004 | Mizutani et al. |
| 6,719,321 B2 | 4/2004 | Yasuhara et al. |
| 6,736,421 B2 | 5/2004 | Blake, III et al. |
| 6,761,374 B2 | 7/2004 | Di Sante et al. |
| 6,783,152 B2 | 8/2004 | Tanase et al. |
| 6,793,239 B2 | 9/2004 | Feldman et al. |
| 6,808,203 B2 | 10/2004 | Takahara |
| 6,837,513 B2 | 1/2005 | Oka et al. |
| 6,848,711 B2 | 2/2005 | Yamamura et al. |
| 6,863,300 B2 | 3/2005 | Ryu |
| 6,869,099 B2 | 3/2005 | Kawasaki et al. |
| 6,883,828 B2 | 4/2005 | Ohki |
| 6,889,999 B2 | 5/2005 | Dominissini et al. |
| 6,893,042 B1 | 5/2005 | Ponceau et al. |
| 6,918,459 B2 | 7/2005 | Breed |
| 6,942,241 B2 | 9/2005 | Yamamura |
| 6,942,288 B2 | 9/2005 | Paetz et al. |
| 6,971,704 B2 | 12/2005 | Cocaign |
| 6,974,151 B2 | 12/2005 | Ochiai et al. |
| 6,974,152 B2 | 12/2005 | Hanjono |
| 7,059,629 B2 | 6/2006 | Takahara |
| 7,134,682 B2 | 11/2006 | Totsuka et al. |
| 2002/0089154 A1 | 7/2002 | Ogawa et al. |
| 2003/0006589 A1 | 1/2003 | Aoki et al. |
| 2003/0006591 A1 | 1/2003 | Yasuhara et al. |
| 2004/0130129 A1 | 7/2004 | Takahara |
| 2004/0160078 A1 | 8/2004 | Hwang |
| 2004/0178609 A1 | 9/2004 | Totsuka et al. |
| 2004/0195809 A1 | 10/2004 | Tanase et al. |
| 2004/0232664 A1 | 11/2004 | Tokunaga et al. |
| 2004/0239081 A1 | 12/2004 | Tredez |
| 2005/0052001 A1 | 3/2005 | Totani et al. |
| 2005/0116447 A1 | 6/2005 | Ryu |
| 2005/0236818 A1 | 10/2005 | Hirose |
| 2005/0253366 A1 | 11/2005 | Uno et al. |

FOREIGN PATENT DOCUMENTS

| | | |
|---|---|---|
| DE | 19622231 | 4/1997 |
| EP | 0841221 | 5/1998 |
| EP | 0904992 | 3/1999 |
| EP | 0980795 | 2/2000 |
| EP | 1310394 | 5/2003 |
| GB | 2261636 | 5/1993 |
| GB | 2 372 484 A | 8/2002 |
| JP | 2002 059802 | 2/2002 |

OTHER PUBLICATIONS

Seatbelts and Air Bags (web page) http://subaru.com.mt/html/leftframe/middleframe/about_subaru/safety/4/4_2.htm.

Can We Make A Difference in Side Impact and Rollover Accidents (web page) http://www2.dupont.com/Automotive/en_US/science_of/auto_safety_A.html.

The All New Mazda MX-5-Part Five (web page) http://www.carpages.co.uk/mazda/mazda-mx5-part-5-28-06-05.asp?switched=on&echo=975748651.

Volvo Raises Safety Bar with C70 Convertible (web page) http://www.findarticles.com/p/articles/mi_m0KJI/is_11_117/ai_n15865049.

Ford Freestyle FX: The World's First Purpose-Built Crossover Vehicle (web page) http://media.ford.com/article_display.cfm?article_id=14043.

Jim Grant's Tech Tips (web page) http://www.alldata.com/techtips/1997/19971124b.html.

European Search Report dated Jul. 5, 2007, 6 pages.

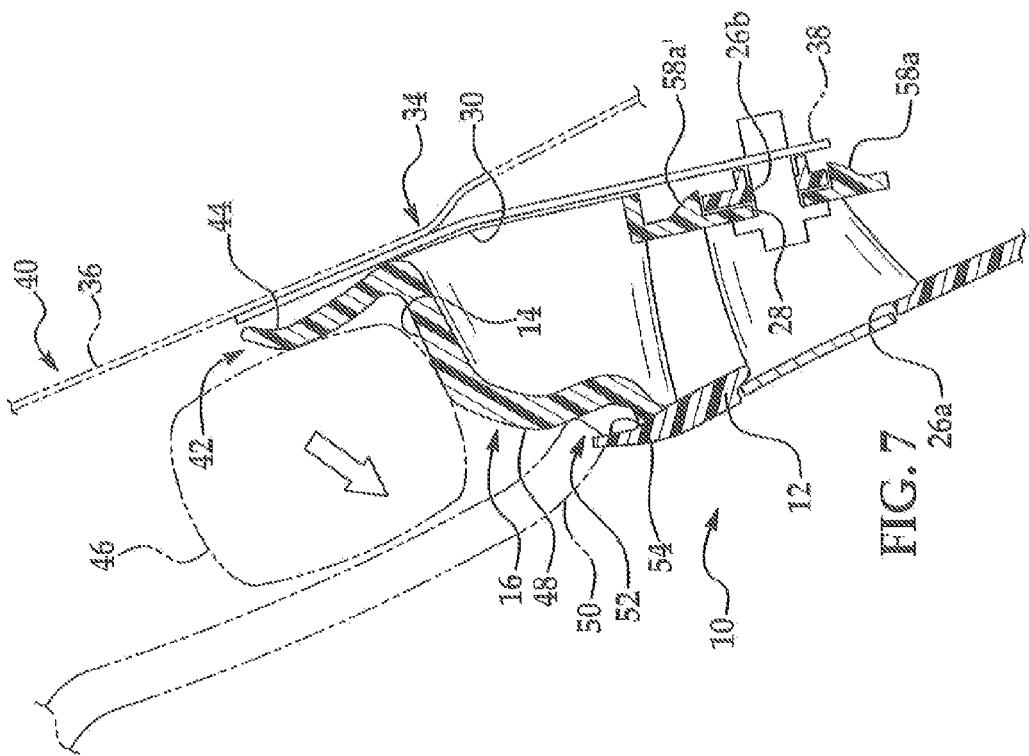
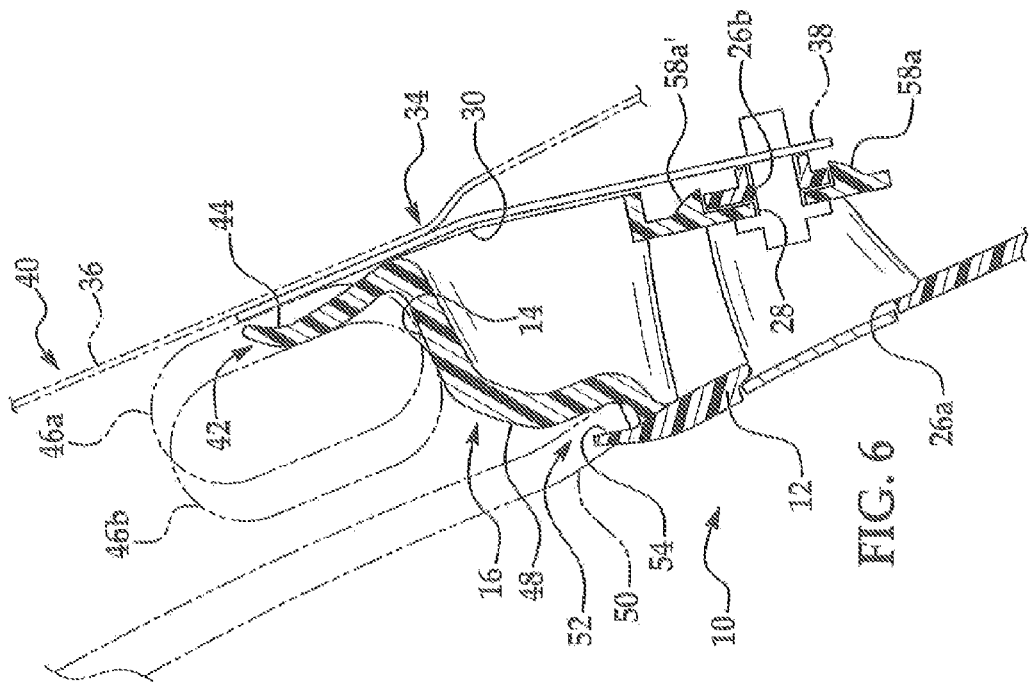

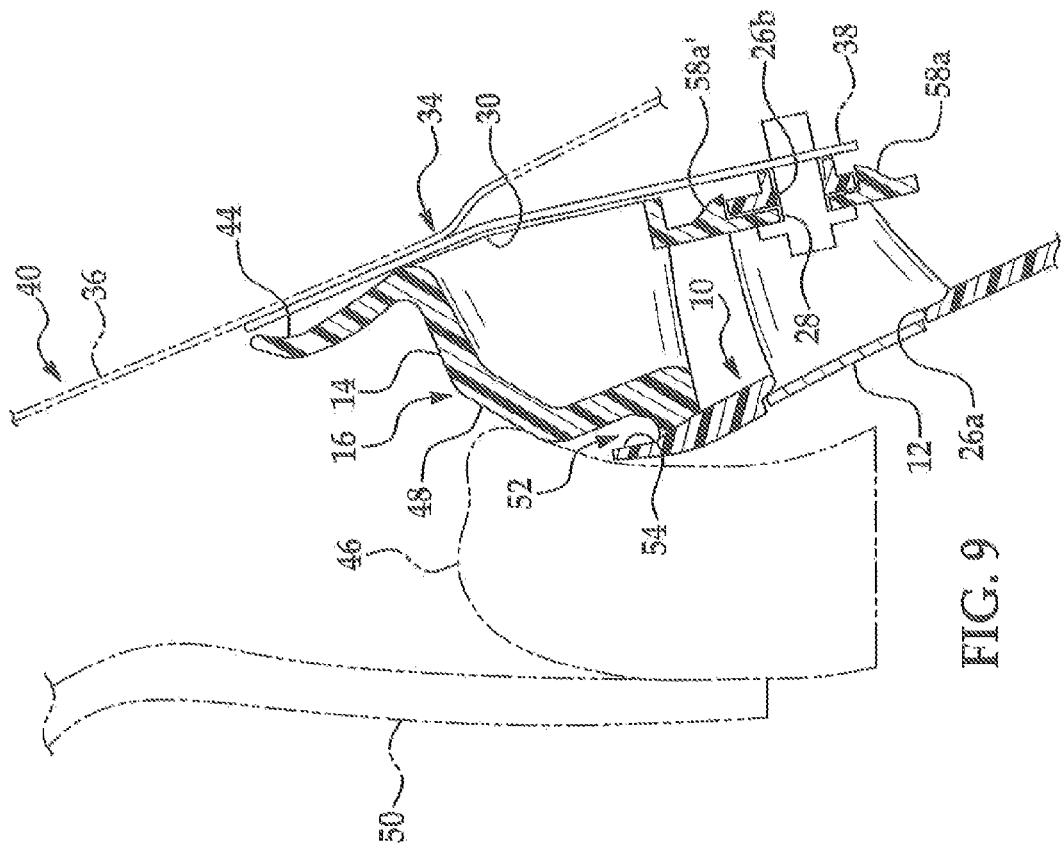
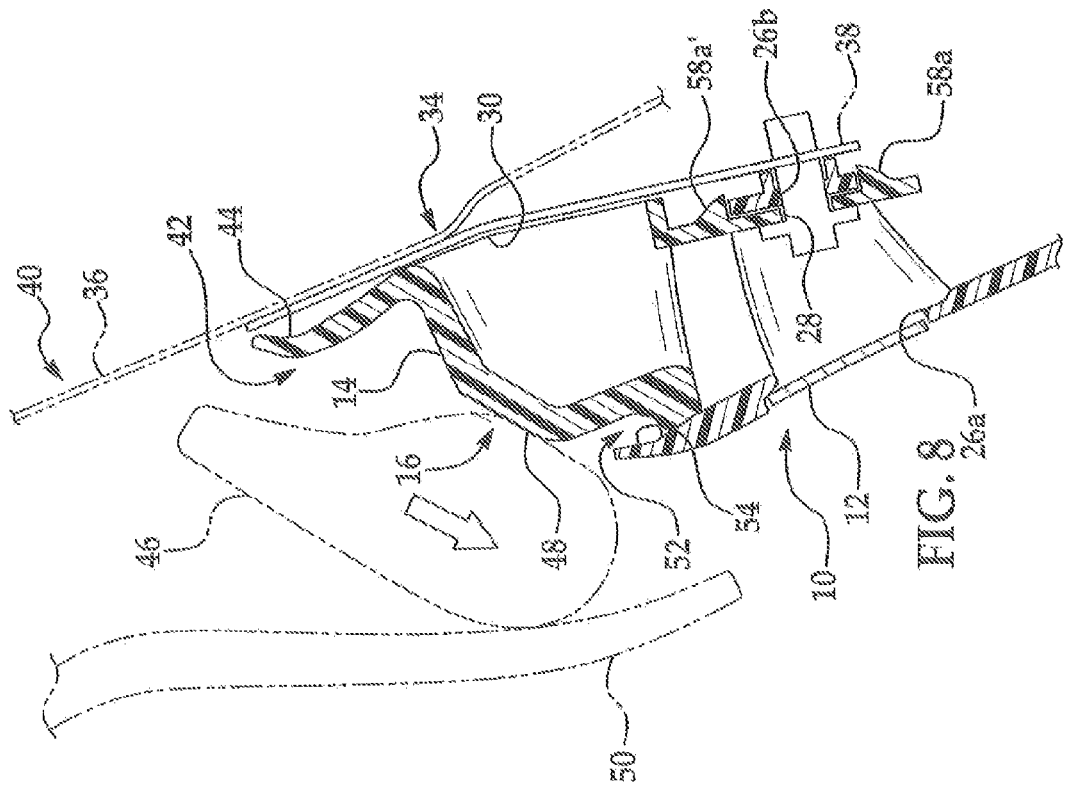

ADD-ON INFLATABLE CURTAIN DEPLOYMENT RAMP TO CENTER PILLAR TRIM

RELATED APPLICATIONS

This application is a continuation in part of copending U.S. Ser. No. 11/384,880 filed on Mar. 20, 2006 entitled INTEGRATED INFLATABLE CURTAIN DEPLOYMENT RAMP INTO VEHICLE BODY TRIM, which is incorporated by reference herein in is entirety.

FIELD OF THE INVENTION

The present invention relates to a pillar trim component and/or pillar structure which can be securely fastened to a motor vehicle body for assisting the deployment and/or support of an airbag located at the juncture with a headliner of the motor vehicle.

BACKGROUND

Various pillar trim component configurations can be seen in U.S. Pat. No. 6,893,042; U.S. Pat. No. 6,672,027; U.S. Pat. No. 6,485,049; U.S. Pat. No. 6,485,048; and UK Patent application No. GB 2,372,484. While each of these devices appears to be suitable for its intended purpose, it would be desirable to provide an airbag support member formed separately from the main body member of the pillar trim component to simply manufacture of the interior of the motor vehicle. It would be desirable to integrate the inflatable curtain ramps into an upper portion of the airbag support member of the pillar trim component. It would be desirable to provide an inflatable curtain pusher wall angled inboard with respect to the inflatable curtain or airbag support surface of the airbag support member. It would be desirable to provide an attachment to simplify installation and to stabilize the location of the pillar trim component. It would be desirable to provide a headliner retaining portion located between the main body member and the airbag support member of the pillar trim component. It would be desirable to provide any of the features described above in any desired combination.

SUMMARY

The present invention includes a pillar trim component having a main body member, a separately formed airbag support member to be assembled to the main body member, and complementary interconnecting shaped portions formed on the main body member and the airbag support member for interlocking assembly of a subassembly of the airbag support member to the main body member prior to installation in a motor vehicle. The complementary interconnecting shaped portions, when assembled, prevent unintended disassembly of the subassembly. The airbag support member can have an airbag guide surface.

The pillar structure for a motor vehicle can support a side curtain airbag. The pillar structure according to an embodiment of the present invention can include a pillar panel, and a pillar trim component having a main body member covering at least a portion of the pillar panel, a separately formed airbag support member assembled to the main body member, and complementary interconnecting shaped portions formed on the main body member and the airbag support member for interlocking assembly of a subassembly of the airbag support member to the main body member prior to installation in a motor vehicle. The complementary interconnecting shaped portions, when assembled, prevent unintended disassembly of the subassembly. The airbag support member can have an airbag guide surface.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 6 is a simplified cross sectional view illustrating a side curtain airbag shown in phantom in a first installed position, and the side curtain airbag shown in phantom moved to an inboard position in response to installation of the pillar trim component according to an embodiment of the present invention;

FIG. 7 is a simplified cross sectional view illustrating an early stage of inflation of a side curtain airbag according to an embodiment of the present invention;

FIG. 8 is a simplified cross sectional view illustrating an intermediate stage of inflation of a side curtain airbag according to an embodiment of the present invention; and FIG. 9 is a simplified cross sectional view illustrating a late stage of inflation of a side curtain airbag according to an embodiment of the present invention.

DETAILED DESCRIPTION

Figure 1:
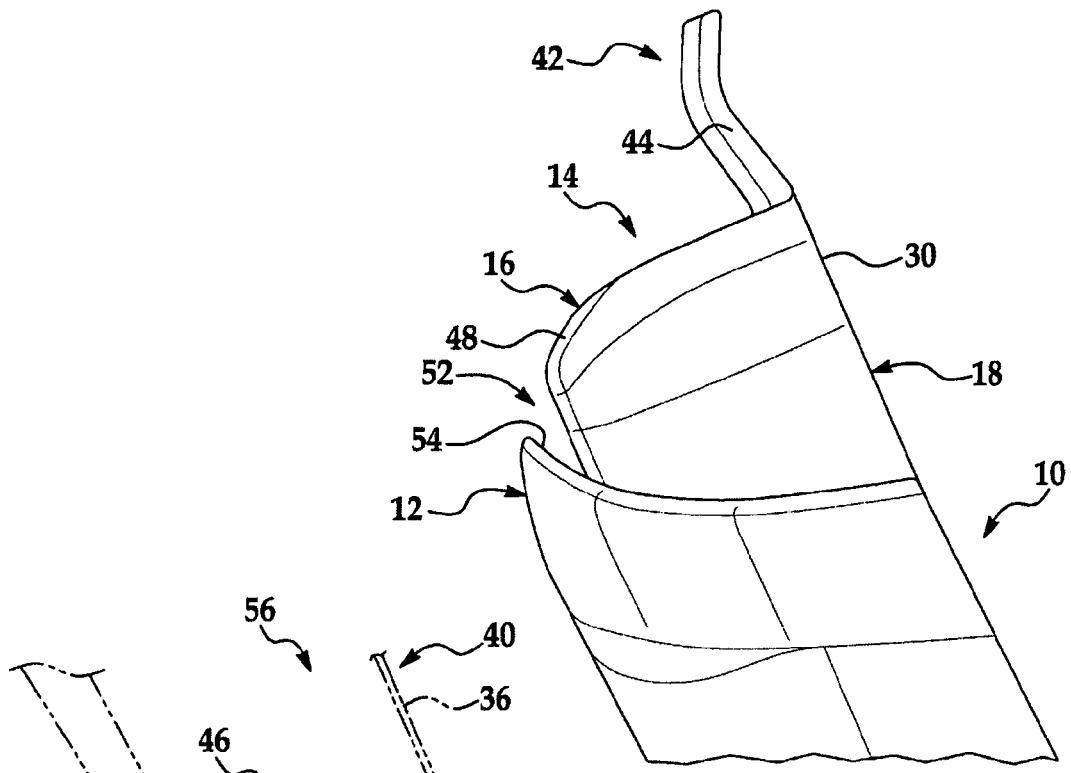
FIG. 1 is a side elevational view of an upper portion of a pillar trim component according to an embodiment of the present invention.

Referring now to FIGS. 1-9, the pillar trim component 10 can include a main body member 12, and a separately formed airbag support member 14 having an integrally formed inflatable curtain deployment trajectory ramp surface 48. The pillar trim component can include complementary interconnecting shaped portions, generically identified as 20, 22, formed on the main body member 12 and the airbag support member 14 for interlocking assembly of a subassembly 24 of the airbag support member 14 to the main body member 12 prior to installation in a motor vehicle. The complementary interconnecting shaped portions 20a, 20a; 20b, 22b; 20c, 22c, when assembled, prevent unintended disassembly of the subassembly 24. The airbag support member 14 extends from the main body member 12 when in an assembled condition. The pillar trim component 10 can include at least one fastener receiving aperture 26a, 26b, 28 formed in each of the main body member 12 and the airbag support member 14, such that the fastener-receiving apertures 26a, 26b, 28 coaxially align with one another when interconnected into a subassembly 24 for assembling the subassembly 24 to a motor vehicle. The airbag support member 14 can include an airbag guide portion 16. One or more reinforcement ribs 18 can be provided supporting the airbag guide portion 16 from the airbag support member 14.

Figure 2:
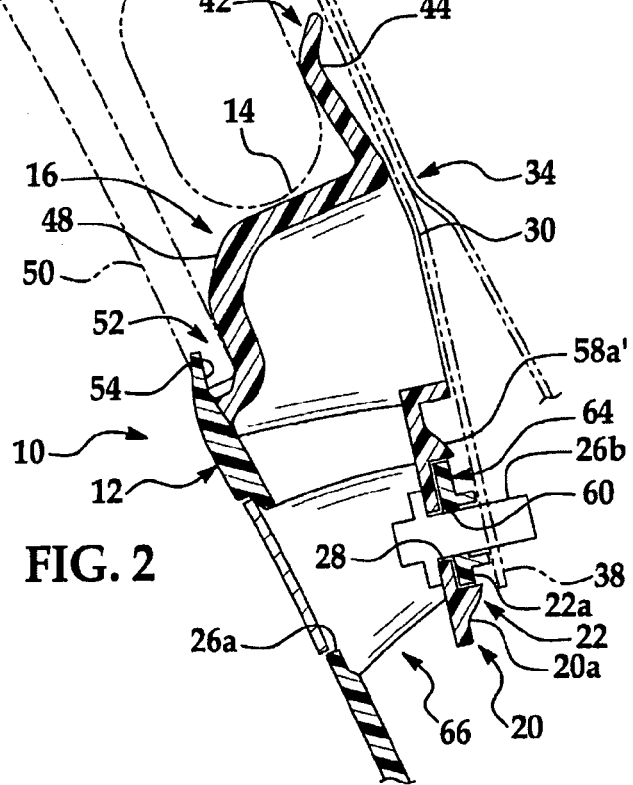
FIG. 2 is a simplified cross sectional view of the pillar trim component of FIG. 1 supporting a side curtain airbag shown in phantom, and connected to a pillar panel and roof portion, such as a roof panel or roof rail, to define a joint shown in phantom at one side and supporting a headliner shown in phantom on an opposite side.

Referring now to FIGS. 1-2, the pillar trim component 10 can include an airbag positioning portion 42 extending from the airbag support member 14 in a direction inboard with respect to the motor vehicle body 40 toward the airbag guide portion 16. The airbag positioning portion 42 can be defined by at least a portion of an upwardly extending wall 44 of the airbag support member 14 angled in an inboard direction with respect to the motor vehicle body 40 toward the airbag guide portion 16. The inboard angled portion of the upwardly extending wall 44 locates the supported side curtain airbag 46 (shown in phantom) spaced in an inboard direction toward a centerline of the motor vehicle body 40 as best seen in FIG. 2.

The airbag guide portion 16 can include a deployment surface 48 located above the main body member 12. The deployment surface 48 can extend between the main body member 12 and the airbag support member 14. The deployment surface 48 can direct the expansion of the side curtain airbag 46 in an inboard direction toward a centerline of the motor vehicle body 40 through a gap that can be created in a joint between a headliner 50 and the pillar trim component 10. The pillar trim component 10 can include a headliner retaining portion 52 located between the main body member 12 and the airbag support member 14. The headliner retaining portion 52 can include a recess 54 formed between the airbag support member 14 and the main body member 12. The recess 54 can be located between the deployment surface 48 and the main body member 12.

A pillar structure 56 (as best seen in FIG. 2) for a motor vehicle body 40 having a side curtain airbag 46 can include pillar panel 38 and a pillar trim component 10. The pillar trim component 10 can include a main body member 12 covering at least a portion of the pillar panel 38, and an airbag support member 14 having an integrally formed inflatable curtain deployment trajectory ramp surface 48. The pillar trim component 10 can include at least one fastener receiving aperture 26a, 26b, 28 formed in each of the main body member 12 and the airbag support member 14, such that the fastener-receiving apertures 26a, 26b, 28 coaxially align with one another when interconnected into a subassembly 24 for assembling the subassembly 24 to a motor vehicle. The pillar trim component 10 can include complementary interconnecting shaped portions 20, 22 formed on the main body member 12 and the airbag support member 14 for interlocking assembly of a subassembly 24 of the airbag support member 14 to the main body member 12 prior to installation in a motor vehicle. The complementary interconnecting shaped portions 20a, 22a; 20b, 22b; 20c, 22c, when assembled, prevent unintended disassembly of the subassembly 24. The airbag support member 14 extends from the main body member 12 when in an assembled condition. The airbag support member 14 can include an airbag guide portion 16. One or more reinforcement ribs 18 can be provided supporting the airbag guide portion 16 from the airbag support member 14. A side curtain airbag positioning portion 42 can extend from the airbag support member 14 in a direction inboard with respect to a centerline of the motor vehicle body 40 away from the pillar panel 38. The side curtain airbag positioning portion 42 can extend from the airbag support member 14 of the pillar trim component 10 in an inboard direction with respect to a centerline of the motor vehicle body 40 toward the airbag guide portion 16. The airbag guide portion 16 can include a deployment surface 48 located above the main body member 12. The pillar panel 38 can be connected to the roof portion 36, such as a roof rail or a roof panel, to define a joint 34. A headliner retaining portion 52 can be located between the main body member 12 and the airbag support member 14 of the pillar trim component 10.

The airbag support member 14 can include an airbag-positioning portion 42 extending in a direction inboard toward the main body member 12, or a headliner-retaining portion 52 located between the main body member 12 and the airbag support member 14, or complementary interconnecting shaped portions 20, 22 formed on the main body member 12 and the airbag support member 14 for interlocking assembly of a subassembly 24 of the airbag support member 14 to the main body member 12 prior to installation in a motor vehicle, or coaxially aligned fastener-receiving apertures 26a, 26b, 28 in the main body member 12 and the airbag support member 14 when assembled together, and any combination thereof. The airbag positioning portion 42 can be defined by at least a portion of an upwardly extending wall 44 of the airbag support member 14 angled inboard toward the main body member 12. The headliner-retaining portion 52 can be defined by a recess 54 formed between the airbag support member 14 and the main body member 12. The pillar trim component 10 can include an airbag guide portion 16 defined by an airbag deployment surface 48 located between the main body member 12 in the airbag support member 14. The pillar trim component 10 can include at least one reinforcement rib 18 defined by an integral wall supporting the deployment surface 48 from the airbag support member 14.

Figure 3:
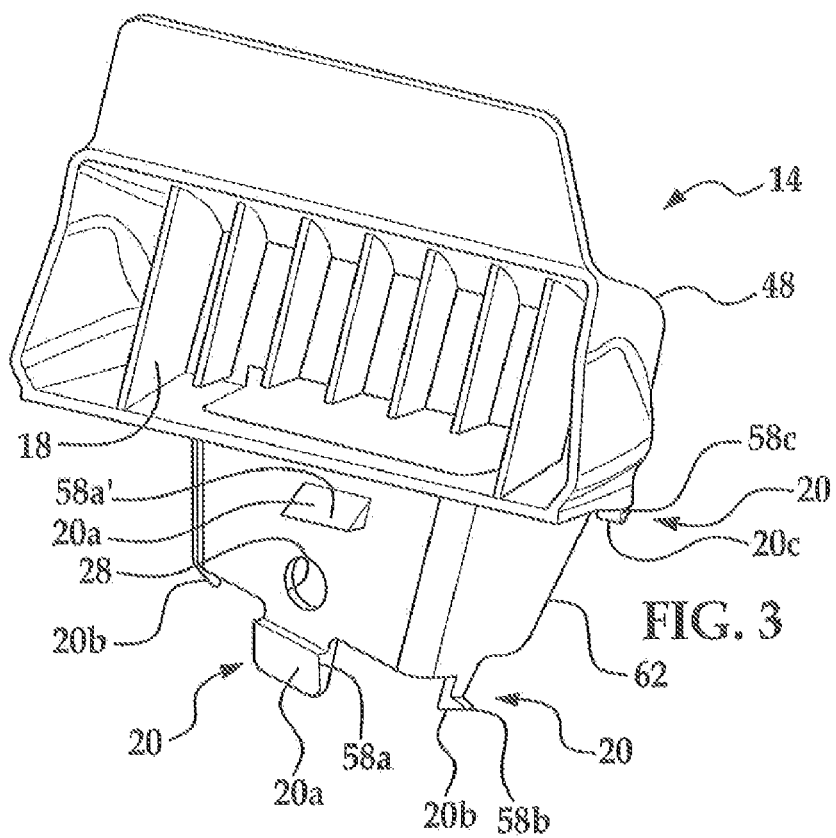
FIG. 3 is a rear elevational perspective view of the airbag support member of the pillar trim component according to an embodiment of the present invention.
Figure 4:
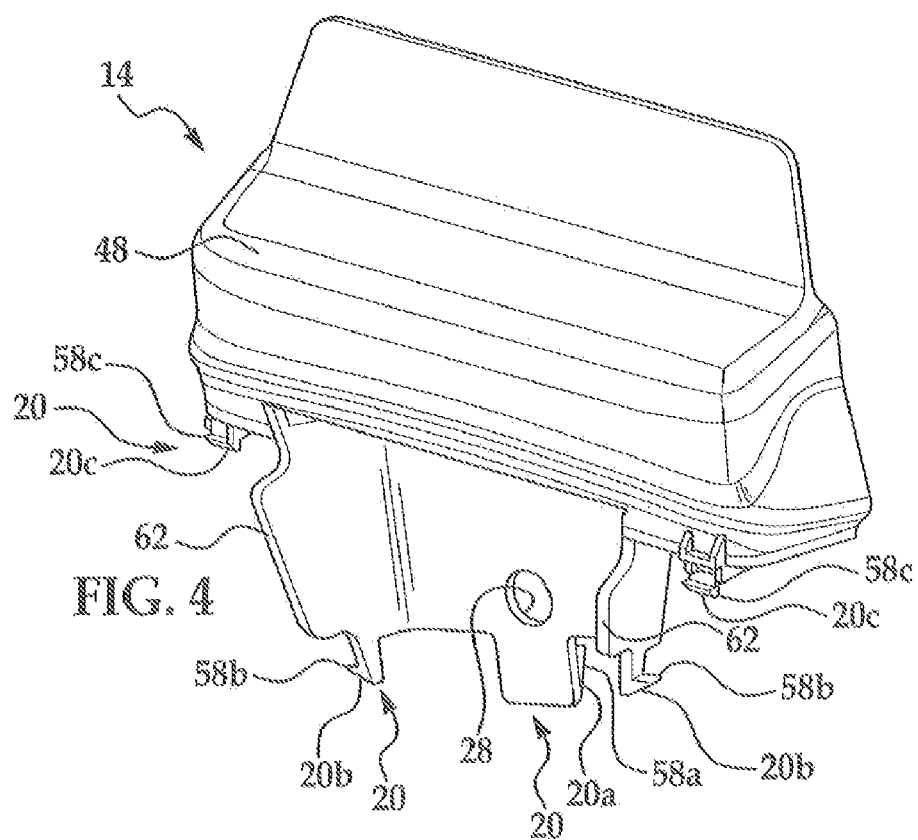
FIG. 4 is a front elevational perspective view of the airbag support member of the pillar trim component according to an embodiment of the present invention.

Referring now to FIGS. 3 and 4, the separately formed airbag support member 14 is illustrated in front and rear perspective views. The airbag support member 14 includes an integrally formed inflatable curtain deployment trajectory ramp surface 48, and complementary interconnecting shaped portions, 20a, 22a; 20b, 22b; 20c, 22c, formed on the main body member 12 and the airbag support member 14 for interlocking assembly of a subassembly 24 of the airbag support member 14 to the main body member 12 prior to installation in a motor vehicle. The airbag support member 14 can include at least one reinforcement section having at least one energy absorbing rib 18 supporting the deployment surface 48 with respect to the other portions of the airbag support member 14.

Referring now to FIGS. 3-5I, the complementary interconnecting shaped portions, 20a, 22a; 20b, 22b; 20c, 22c, formed on the main body member 12 and the airbag support member 14 can include at least one fastening clip 20a, 20b, 20c located on one of the main body member 12 and the airbag support member 14. The at least one fastening clip 20a, 20b, 20c can include a tab 58a, 58a', 58b, 58c located on an outer end for capturing a corresponding complementary wall portion 22a, 22b, 22c of the other of the main body member 12 and the airbag support member 14. The at least one fastening clip 20a, 20b, 20c can include at least one outboard trim fastening clip 20a located on an outboard side of the airbag support member 14 (best seen in FIGS. 3, 5E, and 5F) for capturing a corresponding wall portion 22a formed on an inboard side of the main body member 12. The at least one fastening clip 20a, 20b, 20c can include at least one inboard trim fastening clip 20b located on an inboard side of the airbag support member 14 (best seen in FIGS. 4, 5C, and 5D) for capturing a corresponding wall portion 22b formed on an outboard side of the main body member 12. The at least one fastening clip 20a, 20b, 20c can include at least one fore/aft trim fastening clip 20c located on a fore/aft side of the airbag support member 14 (best seen in FIGS. 4, 5G, and 5H) for capturing a corresponding wall portion 22c formed on a corresponding aft/fore side of the main body member 12. The complementary interconnecting shaped portions 20, 22 including at least one trim fastening clip 20a, 20b, 20c restraining the airbag support member 14 against longitudinal movement relative to the elongate main body member 12.

Figure 5A:
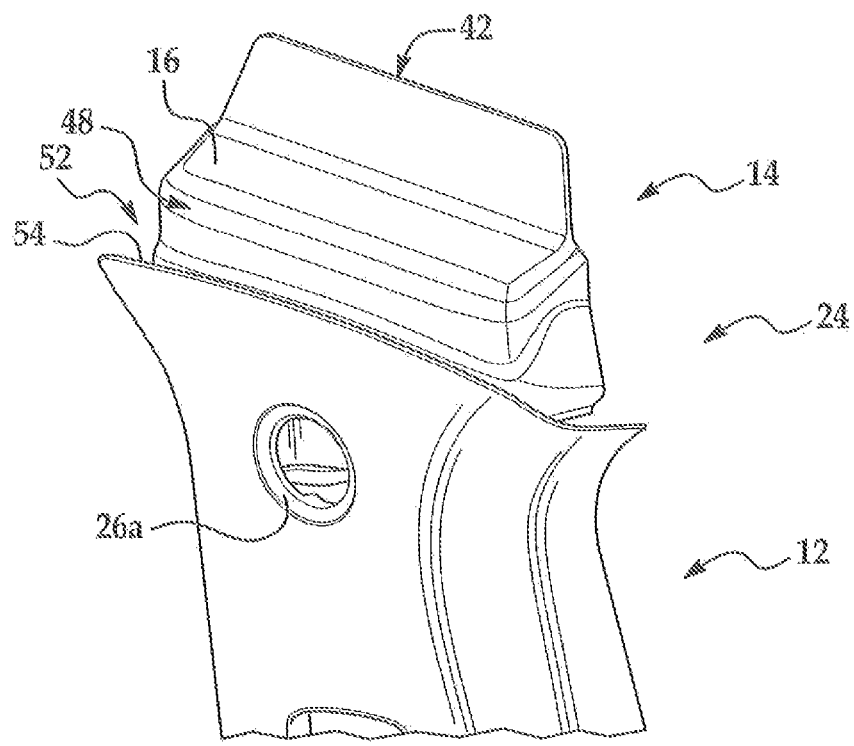
FIG. 5A is a front elevational perspective view of the airbag support member assembled to the upper portion of the main body member of the pillar trim component according to an embodiment of the present invention.
Figure 5B:
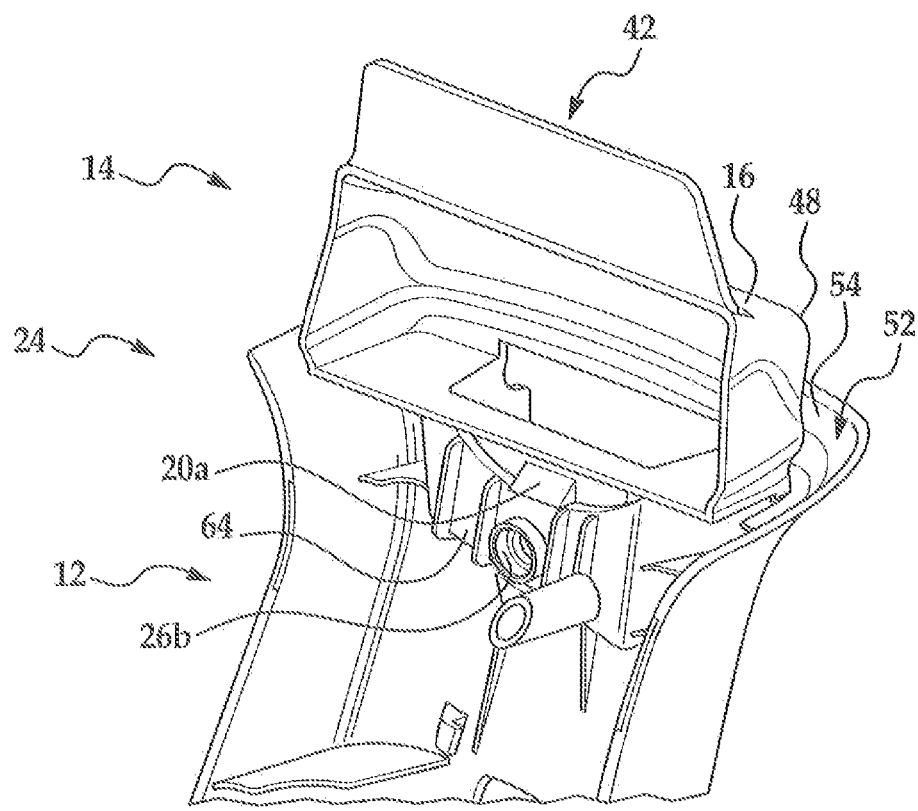
FIG. 5B is a rear elevational perspective view of the airbag support member assembled to the upper portion of the main body member of the pillar trim component according to an embodiment of the present invention.
Figure 5C:
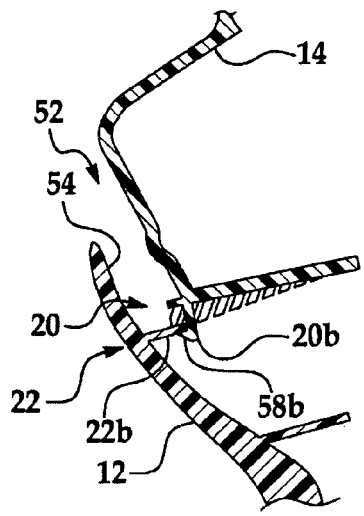
FIG. 5C is a detailed partial side elevational view of the airbag support member assembled to the main body member of the pillar trim component according to an embodiment of the present invention.
Figure 5D:
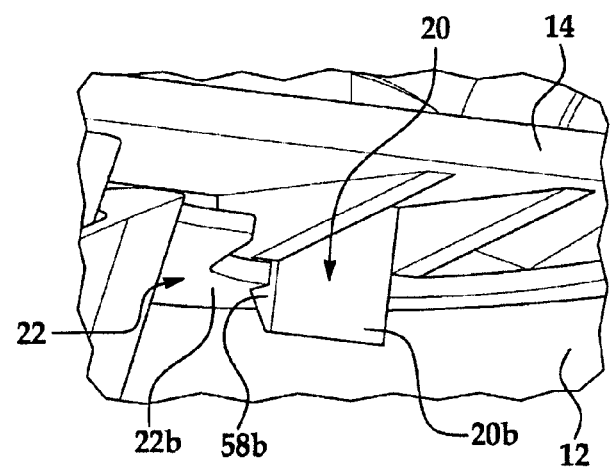
FIG. 5D is a detailed partial perspective view of the airbag support member assembled to the main body member of the pillar trim component according to an embodiment of the present invention.
Figure 5E:
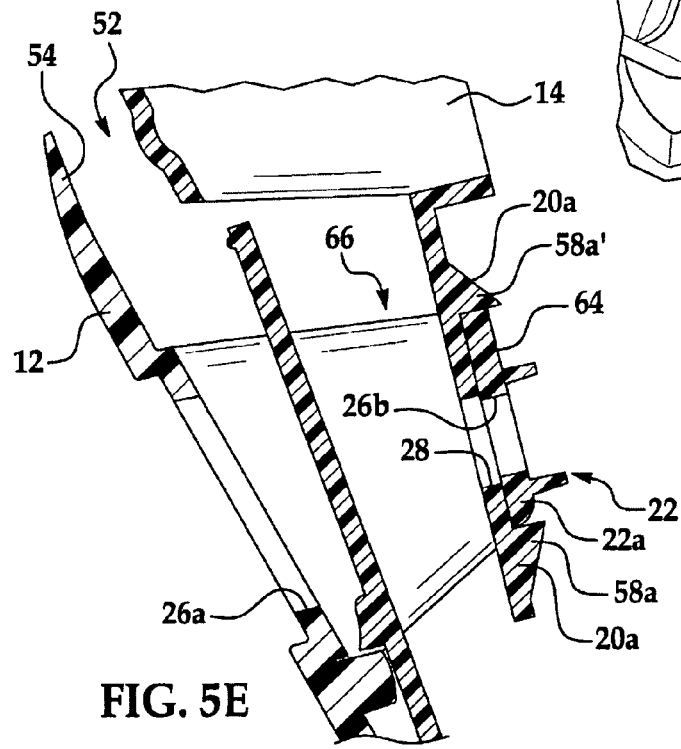
FIG. 5E is a detailed partial side elevational view of the airbag support member assembled to the main body member of the pillar trim component according to an embodiment of the present invention.
Figure 5F:
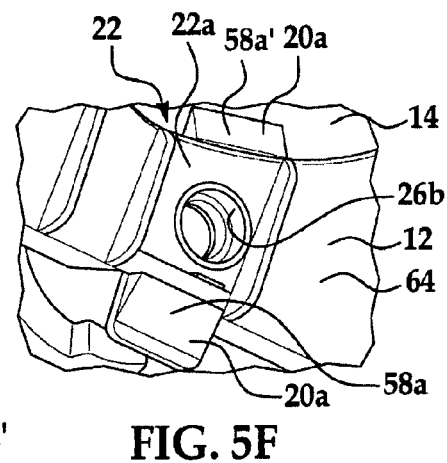
FIG. 5F is a detailed partial perspective view of the airbag support member assembled to the main body member of the pillar trim component according to an embodiment of the present invention.
Figure 5G:
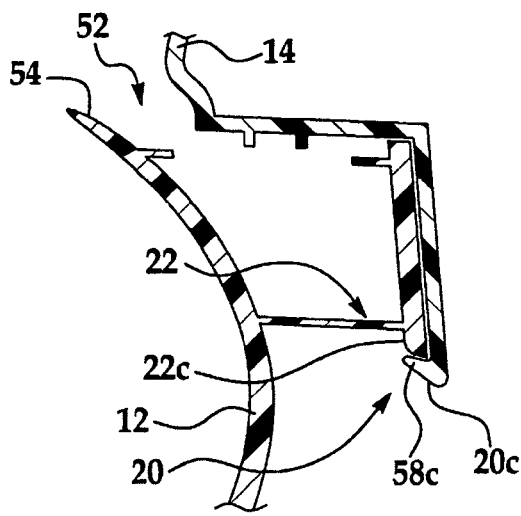
FIG. 5G is a detailed partial side elevational view of the airbag support member assembled to the main body member of the pillar trim component according to an embodiment of the present invention.
Figure 5H:
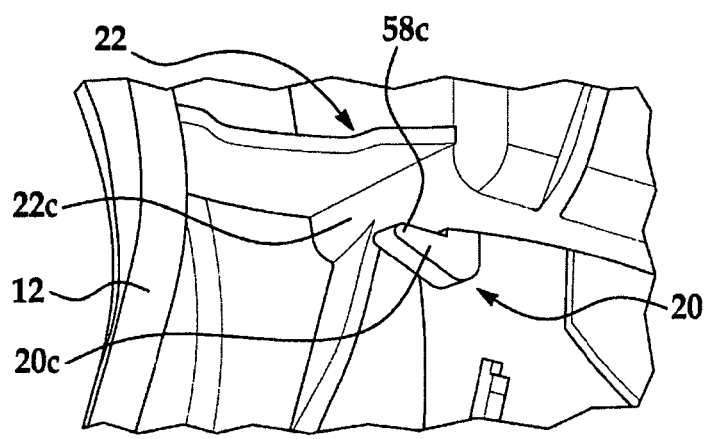
FIG. 5H is a detailed partial perspective view of the airbag support member assembled to the main body member of the pillar trim component according to an embodiment of the present invention.
Figure 5I:
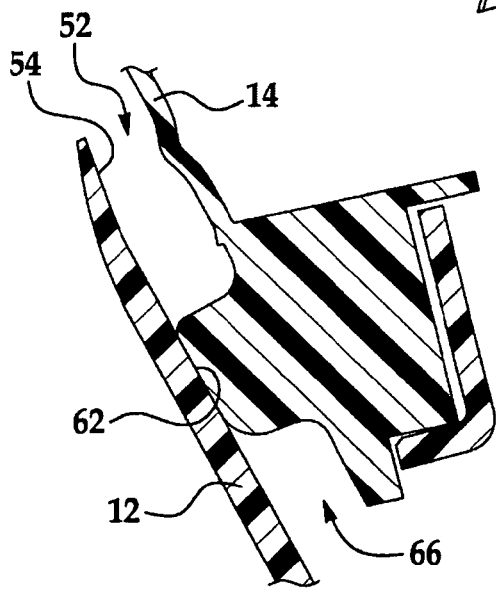
FIG. 5I is a detailed partial side elevational view of the airbag support member assembled to the main body member of the pillar trim component according to an embodiment of the present invention.

Referring now to FIGS. 2, 5A and 5B, each of the main body member 12 and airbag support member 14 can include at least one fastener-receiving aperture 26a, 26b, 28 formed therein, and located to be coaxially aligned with respect to one another when the airbag support member 14 is assembled to the main body member 12. The coaxially aligned apertures 26a, 26b, 28 can receive a fastener 60 for attaching the assembled subassembly 24 to the motor vehicle. The coaxially aligned apertures 26a, 26b, 28 can be located below an upper surface of the main body member 12, and can be accessible from an interior portion of the passenger compartment of a vehicle for assembling and disassembling the pillar trim component 10 with respect to the motor vehicle. At least one flange 62 can be formed on one of the main body member 12 and airbag support member 14 to create an interference fit for resisting inboard/outboard movement relative to one another as best seen in FIGS. 3, 4, and 5I. A bridge 64 can be formed on the main body member defining an aperture 66 for retaining the airbag support member as best seen in FIGS. 2, 5B, 5E, and 5F. When assembled, the complementary interconnecting shaped portions 20, 22 retain the airbag support member 14 connected to the main body portion 12 as a subassembly 24 than can be shipped, stored, and/or handled for assembly to the motor vehicle. The trim fastening clips 20a, 20b, 20c in combination with the corresponding captured walls 22a, 22b, 22c resist movement axially along the longitudinal axis of the elongate main body member 12, resist movement in an inboard/outboard direction, and resist movement in a fore/aft direction of movement. The bridge 64 can define the wall 22a to be captured by the trim component fastener 20a. The at least one flange 62 formed on the airbag support member 14 can create an interference fit for resisting inboard/outboard movement relative to main body member 12, which also helps maintain the interconnection between complementary interconnecting shaped portions 20a, 22a, as best seen in FIGS. 2, 3, 4, and 5I.

Referring now to FIGS. 6-9, in operation an inflatable side curtain airbag 46 can be supported in a stowed position by the separately formed and assembled airbag support member 14 of the pillar trim component 10. As best seen in FIG. 6, an installed airbag 46 is "pushed" into a more desirable pre-deployment position by the integrally formed airbag positioning portion 42 including the upwardly extending wall 44 angled inboard toward the main body member 12 of the pillar trim component 10 during installation of the pillar trim component 10. The headliner 50 can interact with the retaining portion 52 or recess 54 of the center pillar trim component 10 formed in the vehicle inboard side of the integrated ramp or deployment surface 48. The configuration of the headliner retaining portion 52 interacts with the headliner 50 to maintain the headliner 50 in a snug condition between the recess 54 and the integrated ramp vehicle inboard surface 48 located between the main body member 12 and airbag support member 14, as best seen in FIG. 6. As best seen in FIG. 7, during initial early stage deployment of the inflatable side curtain airbag, the airbag pushes against a backside of the headliner 50 which then pulls a lower edge of the headliner 50 away from the recess 54 and the integrated deployment surface 48. At the same time, if the vehicle body sheet metal is pushed inboard, the unevenly formed airbag positioning portion 42 of the pillar trim component 10 can keep the side curtain airbag moving inboard at the same speed and at the same time as the remaining portions of the pillar trim component 10. While continuing deployment of the inflatable side curtain airbag, the airbag further pushes on the backside of the headliner 50 which then continues to flex on itself in a vehicle inboard direction. As best seen in FIG. 8, the integrated deployment surface 48 aids the deploying side curtain airbag to cross over the edge of the recess 54 formed in the pillar trim component 10 during an intermediate stage of inflatable side curtain airbag deployment. The airbag deployment surface 48 can extend inboard at an angle of sufficient magnitude to prevent contact by a deploying airbag with an upper edge of the headliner retaining portion 52. Continued deployment of the inflatable side curtain airbag 46 pushes against the backside of the headliner 50 and crosses over the upper edge of the recess 54 formed in the pillar trim component 10 and then proceeds to a fully deployed position as best seen in FIG. 9. The integrated ramp or deployment surface 48 is useful in reducing the force of any impact, since the back side ribs or reinforcement portion 18 of the pillar trim component 10 can be allowed to deform slightly to slow down an impacting projectile.

Referring again to FIG. 6, during assembly of the pillar component 10 to the motor vehicle body 40, an installer can begin installation of the pillar trim component 10 by slipping the airbag positioning portion behind a previously installed side curtain airbag located at an initial position 46a. The installer can move the pillar trim component 10 in an upwardly direction while moving the pillar trim component 10 simultaneously in an outboard direction. This motion causes the side curtain airbag to be repositioned in an inboard direction by the airbag-positioning portion 42 of the upwardly extending wall 44 of the airbag support member to a pre-deployment stowed position 46b. Any suitable fastener can be used for attaching a lower portion of the pillar trim component 10 form an interior position within the passenger compartment of the vehicle through coaxially aligned apertures 26*a*, 26*b*, 28 of the subassembly 24 of the main body member 12 to the airbag support member 14. To remove the pillar trim component 10, an operator can remove the fastener from the coaxially aligned apertures 26*a*, 26*b*, 28, and pull a lower end of the pillar trim component 10 inboard to release the lower end fastener. The pillar trim component 10 is then moved in an inboard direction while simultaneously lowering the pillar trim component 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A pillar trim component assembly for covering at least a portion of a pillar structure of a motor vehicle having an inflatable side curtain airbag comprising:
    an elongate, main body member for covering at least a portion of the pillar structure, and including first complementary shaped portions formed on the main body member; and
    a separately formed airbag support member having an integrally formed inflatable curtain deployment trajectory ramp surface, and including second complementary shaped portions formed on the airbag support member, wherein the first and second complementary shaped portions are configured and arranged for complementary interconnection into an interlocking subassembly of the airbag support member to the main body member prior to installation of the subassembly into a motor vehicle, the first and second complementary shaped portions further configured and arranged to prevent unintended disassembly of the subassembly;
    each of the main body member and airbag support member having at least one fastener-receiving aperture formed therein to be coaxially aligned with respect to one another when the airbag support member is assembled to the main body member; and
    a fastener that extends through the fastener-receiving apertures of the main body member and the airbag support member and is engageable with the pillar structure of the motor vehicle for attaching an assembled subassembly of the main body member and the airbag support member to the motor vehicle.

2. The pillar trim component assembly of claim 1 further comprising:
    an airbag positioning surface defined by at least a portion of a wall of the airbag support member extending angled inboard toward the ramp surface formed on the airbag support member.

3. The pillar trim component assembly of claim 1, wherein the airbag support member is to be assembled to an upper portion of the main body member with the ramp surface located above and extending toward the main body member.

4. The pillar trim component assembly of claim 1 further comprising:
    a reinforcement section of the airbag support member having at least one energy absorbing rib.

5. The pillar trim component assembly of claim 1, wherein the first and second complementary shaped portions further comprise:
    at least one trim fastening clip restraining the airbag support member against longitudinal movement relative to the elongate main body member.

6. The pillar trim component assembly of claim 1, wherein the at least one coaxially aligned fastener-receiving aperture of the airbag support member is located below an upper surface of the main body member.

7. The pillar trim component assembly of claim 1 further comprising:
    at least one flange formed on one of the main body member and the airbag support member to create an interference fit for resisting inboard/outboard movement relative to one another.

8. The pillar trim component assembly of claim 1 further comprising:
    a bridge formed on the main body member defining an aperture for retaining the airbag support member.

9. A pillar trim component assembly for covering at least a portion of a pillar structure of a motor vehicle having an inflatable side curtain airbag comprising:
    an elongate, main body member for covering at least a portion of a pillar structure, and including first complementary shaped portions formed on the main body member;
    a separately formed airbag support member having an integrally formed inflatable curtain deployment trajectory ramp surface, and including second complementary shaped portions formed on the airbag support member, wherein the first and second complementary shaped portions are configured and arranged for complementary interconnection into an interlocking subassembly of the airbag support member to the main body member prior to installation of the subassembly into a motor vehicle, the first and second complementary shaped portions further configured and arranged to prevent unintended disassembly of the subassembly; and
    the first and second complementary shaped portions having at least one trim fastening clip located on one of the main body member and the airbag support member, the at least one trim fastening clip having a tab located on an outer end for capturing a corresponding complementary wall portion of the other of the main body member and the airbag support member.

10. The pillar trim assembly of claim 9, wherein the at least one trim fastening clip further comprises:
    at least one inboard trim fastening clip located on an inboard side of the airbag support member for capturing a corresponding wall portion formed on an outboard side of the main body member;
    at least one outboard trim fastening clip located on an outboard side of the airbag support member for capturing a corresponding wall portion formed on an inboard side of the main body member; and
    at least one fore/aft trim fastening clip located on a fore/aft side of the airbag support member for capturing a corresponding wall portion formed on a corresponding aft/fore side of the main body member.

11. A pillar structure for a motor vehicle having a side curtain airbag, comprising:
    a pillar panel having at least one fastener receiving-aperture;
    a pillar trim component subassembly comprising:
        an elongate, main body member for covering at least a portion of the pillar panel, a separately formed, airbag support member interconnected in a subassembly to an upper portion of the main body member, the airbag support member having an integrally formed inflatable curtain deployment trajectory ramp surface, and each of the main body member and the airbag support member having at least one fastener-receiving aperture, such that at least one of the fastener-receiving apertures in each of the main body member and the airbag support member coaxially align with one another when interconnected in the subassembly; and a fastener that extends through the at least one fastener-receiving apertures of the pillar panel, the main body member, and the airbag support member to connect the pillar trim component subassembly to the pillar panel.

12. The pillar structure of claim 11, wherein the at least one coaxially aligned fastener-receiving aperture of the airbag support member is located below an upper surface of the main body member.

13. The pillar structure of claim 11, wherein the airbag support member includes an airbag positioning portion extending in a direction inboard away from the pillar panel.

14. The pillar structure of claim 13, wherein the airbag positioning portion is defined by at least a portion of a wall of the airbag support member extending angled inboard toward the ramp surface.

15. The pillar structure of claim 11, wherein the airbag support member is to be assembled in a subassembly to an upper portion of the main body member prior to assembly to the pillar panel, the assembled airbag support member having the ramp surface located above and extending toward the main body member.

16. The pillar structure of claim 11 further comprising:
a reinforcement section of the airbag support member having at least one energy absorbing rib.

17. The pillar structure of claim 11 further comprising:
complementary interconnecting shaped portions formed on the main body member and the airbag support member for interlocking assembly into a subassembly of the airbag support member and the main body member.

18. The pillar structure of claim 17, wherein the complementary interconnecting shaped portions further comprise:
at least one trim fastening clip restraining the airbag support member against longitudinal movement relative to the elongate main body member.

19. The pillar structure of claim 17 further comprising:
at least one flange formed on one of the main body member and the airbag support member to create an interference fit for resisting inboard/outboard movement relative to one another.

20. The pillar structure of claim 11 further comprising:
a bridge formed on the main body member defining an aperture for retaining the airbag support member.

21. A pillar structure for a motor vehicle having a side curtain airbag, comprising:
a pillar panel; and
a pillar trim component subassembly comprising:
an elongate, main body member for covering at least a portion of the pillar panel;
a separately formed, airbag support member interconnected in a subassembly to an upper portion of the main body member, the airbag support member having an integrally formed inflatable curtain deployment trajectory ramp surface;
each of the main body member and the airbag support member having at least one fastener-receiving aperture, such that at least one of the fastener-receiving apertures in each of the main body member and the airbag support member coaxially align with one another when interconnected in the subassembly for receiving a fastener for assembling the subassembly to the pillar panel;
complementary interconnecting shaped portions formed on the main body member and the airbag support member for interlocking assembly into a subassembly of the airbag support member and the main body member; and
the complementary interconnecting shaped portions having at least one trim fastening clip located on one of the main body member and the airbag support member, the at least one trim fastening clip having a tab located on an outer end for capturing a corresponding complementary wall portion of the other of the main body member and the airbag support member.

22. The pillar structure of claim 21, wherein the at least one trim fastening clip further comprises:
at least one inboard trim fastening clip located on an inboard side of the airbag support member for capturing a corresponding wall portion formed on an outboard side of the main body member;
at least one outboard trim fastening clip located on an outboard side of the airbag support member for capturing a corresponding wall portion formed on an inboard side of the main body member; and
at least one fore/aft trim fastening clip located on a fore/aft side of the airbag support member for capturing a corresponding wall portion formed on a corresponding all/fore side of the main body member.

* * * * *